Figure 1:
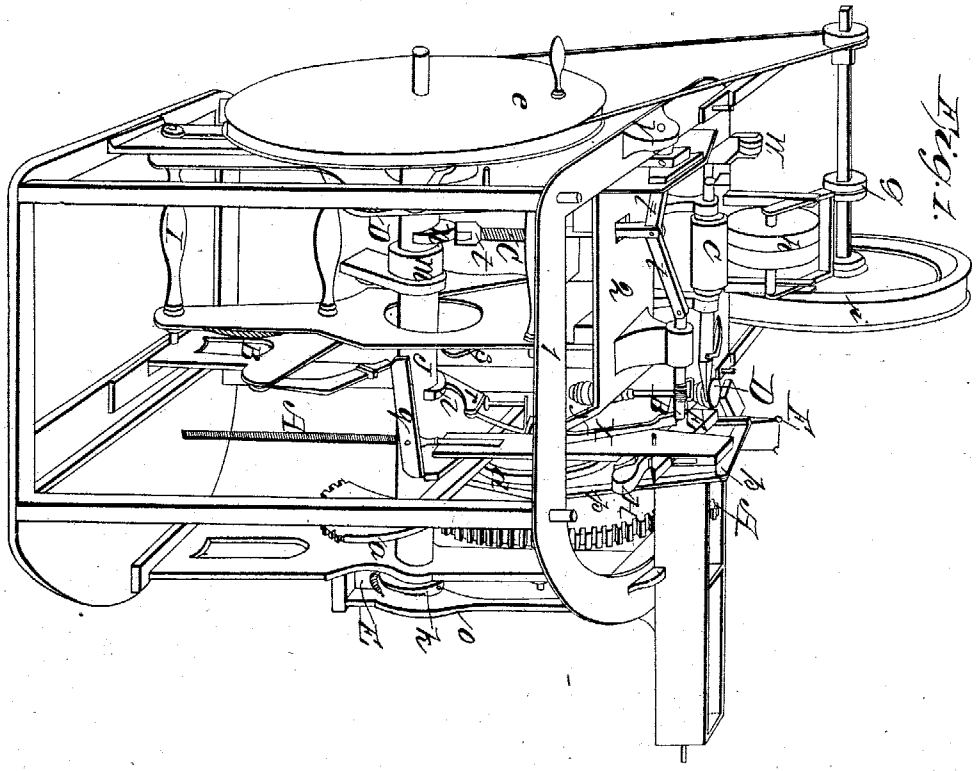

7123X

3 Sheets—Sheet 1.

J. J. HOW.

PIN MACHINE.

Patented June 22, 1832.

7123X
3 Sheets—Sheet 2.
J. J. HOW.
PIN MACHINE.
Patented June 22, 1832.
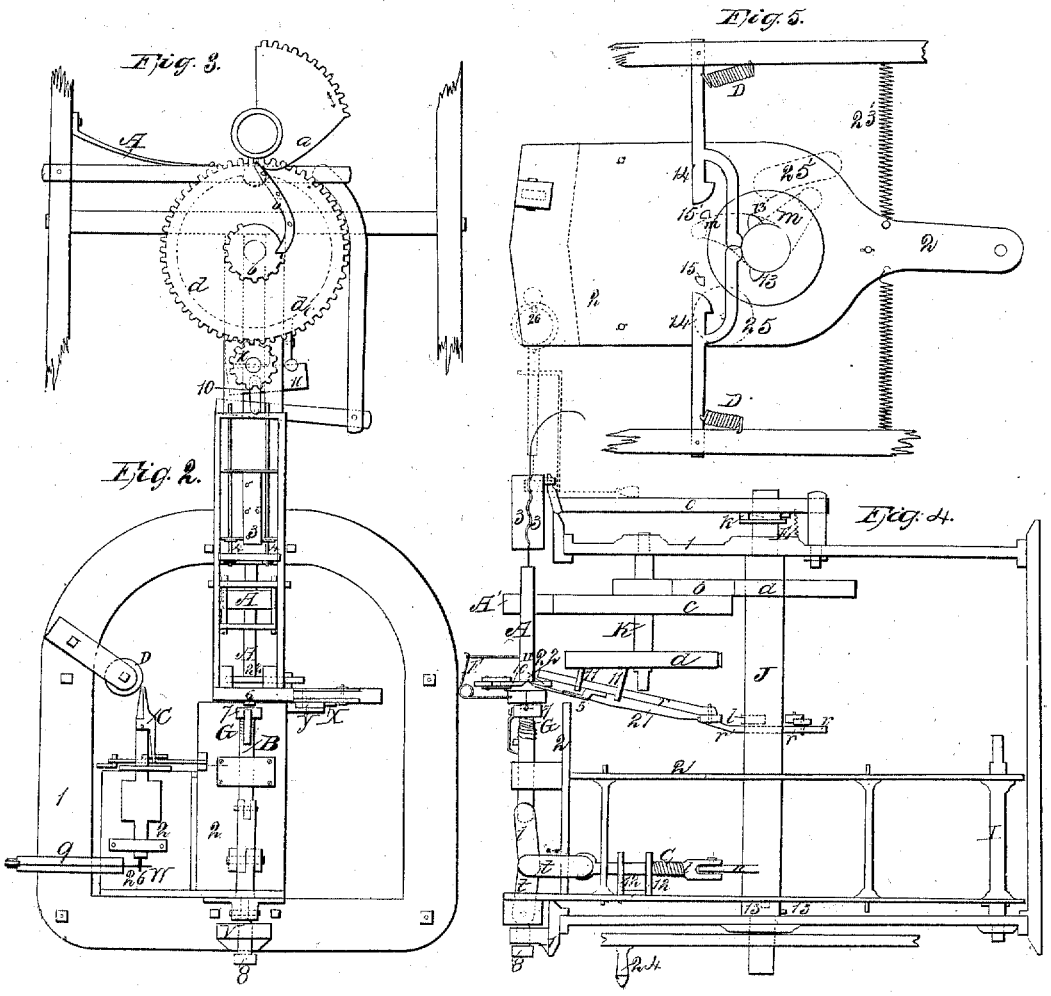

7123X
J. J. HOW.
PIN MACHINE.
Patented June 22, 1832.
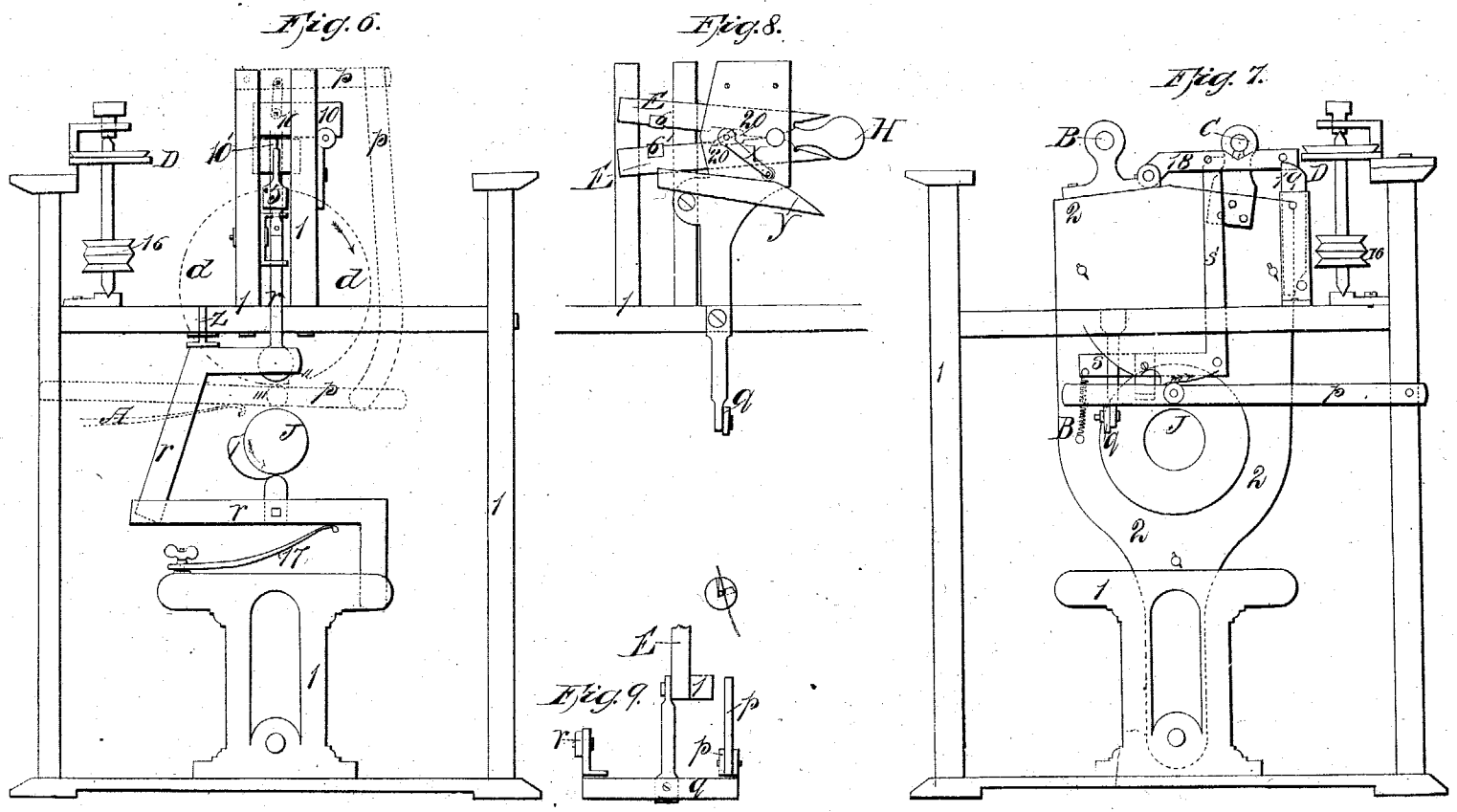

John I Howe
Letters Patent

The schedule referred to in these Letters Patent and making part of the same containing a description in the words of the said John I Howe himself of his improvement in the machine for manufacturing pins.

To all whom it may concern. Be it known that I John I. Howe have invented an improved machine for manufacturing common Pins by means of which the wire is straightened, cut into lengths, headed and pointed, and the pin delivered in a state ready for whitening; and that the following is a full and exact description thereof and of the manner in which it operates reference being had to the accompanying drawings which make a part of this specification. Fig 1. is a perspective view of the machine. Fig 2. A plan showing the principle working parts. Fig 3. a Section showing the action for winding the head and cutting off the wire &c.

Fig 4. a section parallel to the main shaft, showing some of the necessary parts of the machine. Fig 5. end elevation of the moveable frame or carriage. Fig 6 vertical section at right angles to the main shaft, with the feeding apparatus &c. Fig 7. Section in the same direction, showing the means of opening the pointing forceps and other parts. Fig 8 the heading vice and its appendages. Fig 9. Apparatus concerned in closing the pointing forceps, fig 7. &c The individual parts of the machine are marked in the respective figures with Roman Capitals with small roman Letters with Italic capitals, and with numbers. The same marks on the different figures refer in all cases to similar parts.

A [illegible] winding apparatus. B. Head compressor. C. Pointing forceps. D Pointing wheel. E. Heading vice. K' Pinion on the wind[illegible] tool.

--- a. An eccentric curve, combined with a segment having teeth or cogs which together extend over one half of the circumference of the main Shaft, and act during one half its revolution upon ...

b are [illegible] connected with a pinion which is driven through one [illegible] revolution by the action of U at each revolution of the main shaft.

The curves UV b are each involute; evolved from a circle having for its radius half the distance between the shafts marked U V K. each of them extends over one quarter of a circle and from a circle corresponding with the pitch line of the pinion b, to one corresponding with that of the section or cogs on U. In operation they act and roll upon each other at the line of centres. This being a new and peculiar mode of effecting the kind of motion required, I have [illegible] [illegible] at greater extent than most other parts of the machine which, although new in their combination, are not considered as such in their principle or action. C Wheel, driving the pinion N' they being to each other as 1 to 4. d. a wheel or wiper having on its [illegible] [illegible] a projection and a semicircular notch, which acting upon the system of levers p. governs the movements of the blades 10 e. f. g. h. i. Band wheels, communicating motion from the main shaft to the pointing [illegible], and pointing wheel.

k. A wiper acting on lever o carrying back the feeder 3 which [illegible] the main wire [illegible] is brought up by the spring [illegible]

L. Wiper acting upon a system of levers, carrying back the heading wire feeder, which is brought up by a spring (1[illegible])

m. m' Arms with friction rollers at their ends and acting on cams, which serve to move the carriage 2 back and forth.

n. Wiper giving action to the head compressing apparatus.

o. Lever acting on the feeder 3 p. (see referred to in d)

q. Lever, which by the action of p. operates on 5 a bent lever which keeps open the pointing forceps during the required period.

r. Levers to carry back the heading wire feeder (5)

t. Head compressor levers. v. Standard on frame (1) for the regulating screw 8 w a ring regulating the position of the pointing forceps previous to their being opened x arm connected with a [illegible] lever (20) acting between the jaws of the heading vice [illegible]. and opening them when required.

X7123 3

Y. Inclined plane which by the moving of the carriage (2) acts upon
X. a screw governing the supply of heading wire

---

A. Spring, which acting through the lever p &c. elevates the blade (10)
B. Spring, which by drawing down one arm of the bent lever 3 &c. forces the shoulder at the extremity of the other arm under the pin (x) in the lever (18) when said lever is elevated in passing over the inclined plane (1) on the cam (19).

C. Spring retracting the head compressor B. D.D'. Springs which bring down the catches (11, 14'.)

E. Spring retracting the lever O. when relieved from the action of the wiper K. F. Spring, which elevates the inner extremity of the apparatus A to admit the free passage of wire over the stationary blade 10'. G. Spring to regulate the positions of the clasp (7) on the extremity of the head compressor B.

H. Spring to close the vice R. I. Shaft, on the extremities of which the carriage (2) vibrates. J. Main shaft, from which the particular motions are derived. K Shaft of the wheel C. and its appurtenances.

---

1. Stationary or permanent frame. 2 Carriage or moveable frame.
3. Feeder, which supplies wire for the bodies of the pins.
4 Regulating nuts which by being screwed off or on, shorten the length on the pin. 5 Feeder which supplies the heading wire.
6, 6' Heading dies. 7 A Clasp which fits snugly on the dies 6, 6'. when they are closed, and serves to prevent their separating when the compression is made to form the head. 8. A regulating screw, to graduate the pressure on compressing the head. 9 A fixture attached to the frame 1. which at one end ' has a slit which serves to guide the arm," of the ring W. and at the other end " a small pulley "'
10. 10'. Two blades with cutting edges which serve the purpose of cutting nippers or pincers, first holding the two wires while the heading wire is winding around the other, and the feeders are carried back, and then at the proper time cutting off both wires.

11. 11' & 12. 12' Guides. 13. 13' Wipers which lift the catches.
14. 14' Catches which respectively retain the carriage 2 in a fixed
position during certain stages of the operation of the machine.
15. 15' Pins of which the above catches take hold.
16. A pulley by means of which the pointing wheel D receives
its motion from the wheel 1
17. A spring which carries up the feeder 3.
18 A lever which serves to open the pointing forceps C.
19 A cam which serves to elevate the lever 18.
20 A [illegible] placed between the jaws of the vice E to separate them
at the proper period in the operation of the machine.
21 Heading wire. 22 lips on the winder
23. 23' Spiral springs which act upon the carriage 2. drawing it towards the centre when it is inclined to one side or the
other. 24. Winch. 25. 25' Cams on the carriage 2.
26 Eccentric pin or crank attached to the shaft of the pointing
forceps C. The drawings with the exception of the perspective
view fig 1. are on a scale reduced about one half from the actual machine. The skilful machinist by an examination of the fore
going references and the accompanying drawings will readily trace the general
operation of the machine, and will perceive that two separate wires
are introduced one for the formation of the body and the other that
of the head of the pin. The wire for the Body is passed in between the
straightning jaws 3. 3' of the feeder fig 4. It passes thence through
the head winder A which is tubular, and also between the cut
ting blades 10. 10'. The space between the straightning jaws is regu
lated by the screws marked ', '', '''. These operate upon the common
principle adopted for straightening such wire.
The wire for the head is passed between the jaws of the feeder 3.
the end of it passing between the blades 10, 10' The jaws of the
feeder are made to hold the wire with sufficient firmness by means
of a screw. In this situation of the machine the wire for the body of the pin. passes on from right to left from the feeder 3.

to No 7. and lies between the cutting edges of the blades 10. 10'. The
heading wire also passes between these blades but from left to right
and in this case if the machine be set in motion the various parts
which concur in the formation of the pin will be simultaneously
or successively acted upon. In forming the head of the pin the
moveable blade 10 ^will partially close on the fixed blade 10' holding the two wires firmly between their edg
es. The head winder A will revolve, catching the end of the
heading wire in a lip or projection LL. at its end and winding it
spirally upon the body wire in contact with the blades. These move
ments are effected in the following manner The eccentric curve
or wing connected with the segment of cogs a (fig 3.) comes in contact
with the eccentric connected with the pinion b on the shaft K
(fig 3) the former carrying the latter forward until the teeth
of the segment a. strike into gear with the leaves of the pinion b. In
this part of the movement, each of the shafts J & K passes through one fourth
of a revolution; in the subsequent part of the movement, that is when the
segment a acts upon the pinion b. The main shaft J passes through one
fourth whilst the shaft K passes through $\frac{3}{4}$ of a revolution; so that K
makes one entire revolution and J but one half, and the pinion on the win
der A is driven through four revolutions during half a revolution of J and is
at rest during the other half. at which period the operations are effected
preparatory to the winding of another head.

As some of the respective operations go on simultaneously, it may be sup
posed that previously to the winding process just described, other heads
had been wound the head perfected and the pin cut off and taken into
the pointing forceps, and carried to the pointing wheel, I shall however carry
the one on which I have supposed the head to be wound, through its in
dividual stages When the pointing forceps have arrived in a position to
take hold of a pin, the head of which had been completed, the wheel d.
will have arrived at the position in which it is shown in fig 6. The for
ceps will then be closed on the pin previously projected, and the wires
cut off by the action of the wheel d. which will depress the moveable blade
upon the fixed one. Immediately after the movement last described,

[illegible] those for feeding in the wire for the body of the pin. The moveable blade is raised, and the front end of the winder, A. is elevated. The former is effected by the spring A. acting on the lever. P. and its appendages, the friction roller ". falling into the notch " in the wheel d. as shown in fig 3. The latter takes place immediately upon the cutting off the wire by means of the spring P. Figs 1 & 4. a wire from which descends to the frame in which the winder A revolves. and which it lifts to a distance requisite to allow the body wire of the pin, with the unfinished head on it to pass freely over the stationary blade. 10

The jaws of the heading vice E. being at this time open. and the feeders 3. & 3. being released from the action of their respective wipers are brought up by the springs shown at E. Fig. 4. and at 17 Fig 6. the feeder 3. is drawn forward; the wire with the unfinished head is thereby advanced between the blades of the heading vice; which closes on it by the action of the spring H. embracing it just at the back of the unfinished head. The pointing forceps had seized the one previously headed, and carried it to the pointing wheel. by the lateral motion of the carriage 2. which at the same time brings the heading apparatus R. opposite to the unfinished head. The [illegible] N. upon the shaft J. advances the die on the end of R. the proper excavation in which form and finish the head. The carriage 2 again returning whilst the jaws E. and in the jaws E. are opened by the lever 20. the pointing forceps having opened and dropped their pointed pin. pass between the jaws E. and grip the newly headed pin. A new vibration of the carriage removes the forceps with their charge. bringing the unfinished point against the revolving pointing wheel D.

The pulley of the pointing forceps shaft. comes in contact with and receives a rotary motion from the wheel h. driven by a band from the wheel g. Fig 1. The point of the pin consequently revolves on the revolving wheel D and there receives a regular conical point.

The pointing wheel is formed of two circular plates of steel. bevelled on their edges, and united by their smaller faces thus forming a groove. The bevelled edges are formed into teeth or points of the requisite fineness The bevels in the two plates are made of different angles to avoid the [illegible] which would otherwise exist on the point. The pointing wheel

X 7123 may vary in its velocity ranging between 50 and 100 revolutions for one of the
main shaft. During the pointing the carriage remains stationary, being held
in a fixed position by the catch 14. (fig 5.) holding upon the pin 13. which
prevents its moving towards the centre, whilst being drawn by the spring
23. towards the centre, it is prevented from receding farther: The mode
of engaging and disengaging the catches will be made manifest by attention
to the drawings, and the references to them. Connected with the motion
of the carriage (2) are several others which must be simultaneously per
formed. One of these is the giving to the pointing forceps the proper posi
tion for seizing the next pin, that is, with its lower jaw downwards. this
is effected by means of the eccentric pin 26. on the back end of its shaft
the ring W. embracing this pin. and being acted upon by a weight and
cord passing over a pulley turns the forceps from any other position in
to that required; the manner of opening the pointing forceps is shown
in Fig 7. where the carriage is supposed to be moving from right to
left. C. is a section of the forceps shaft. and 51. a section of the arm
(1. fig 2) connected with the moveable blade of said forceps near
its extremity. On the motion of the carriage. the pin " projecting from
the side of the lever 18. slides upon the inclined plane 19 carrying the
lever up against the arm 51, and pressing it against the shaft of
the pointing forceps depresses the moveable jaw This and the subsequent
action of closing it. as well as many of the individual parts of the ma
chine. may be variously modified so as to answer the same end. and
do not therefore require to be minutely described, as every competent work
man would actually make such variations, whilst the general principle
of the action of the whole apparatus would be still retained Although the individual parts of the before described machine. such
as the levers, cams. wipers, forceps, dies, wheels, pinions, and other appen
dages, are the common elements of many other machines, and several
of them have been used in instruments for manufacturing pins, and can
not therefore be claimed as new. I have yet so combined them as to
give a specific character and action to my machine, producing by
these new combinations, new and useful results. and it is therefore, apin this combination of parts that I mainly rest my claim to its exclusive use,
and, besides, this general arrangement, I claim the specific arrangement
of the apparatus, by which the winding of the wire to form the head of
the pin, is effected. and I also claim the peculiar arrangement of,
of the eccentric curves and segments, represented in figure 6. the
main rotary parts of which are marked a, b, b. which arrangement
produces a rotary motion varying in its velocity. and which may
be advantageously applied in the construction of other machinery
where such a motion may be advantageous. such application how
ever to any machine will ... be considered as a violation of my
right."

Witnesses
Thos. [illegible] Jones,
Robt. Clarke.

John I. Howe 1-3-94 [illegible]

(Patented 22. June 1832)